G. W. ANDERSON.
CORN KNIFE.
APPLICATION FILED JUNE 10, 1919.
1,331,407.
Patented Feb. 17, 1920.
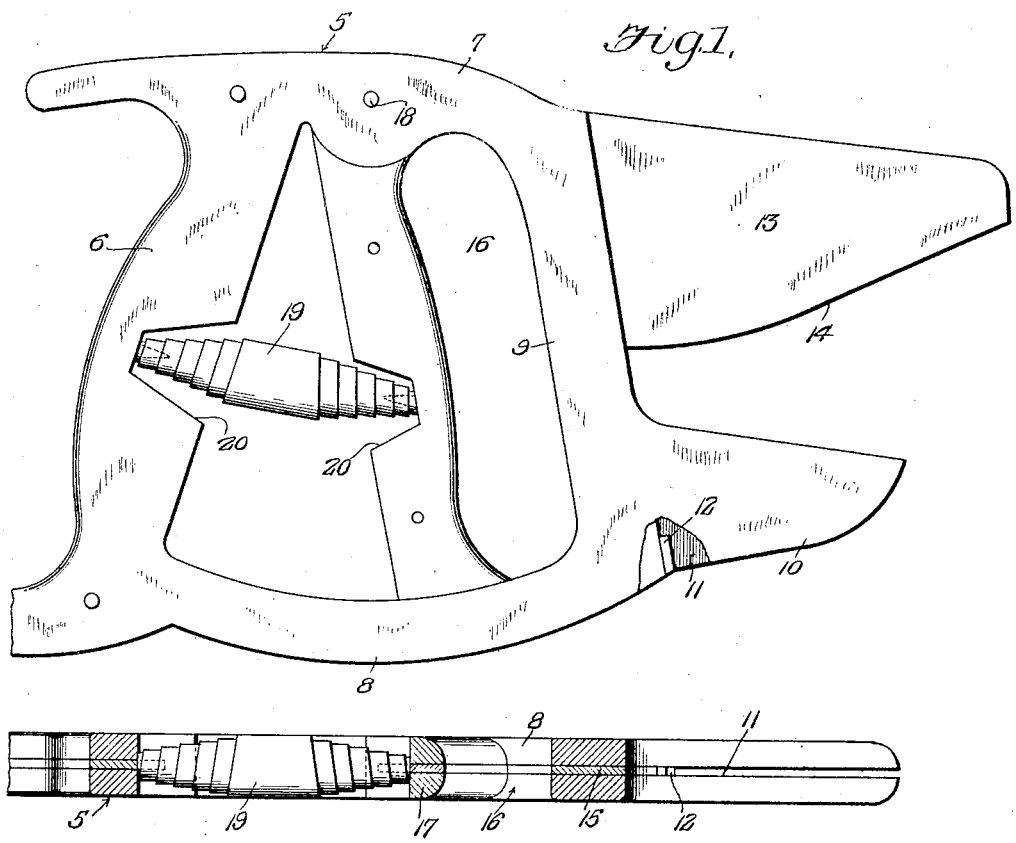
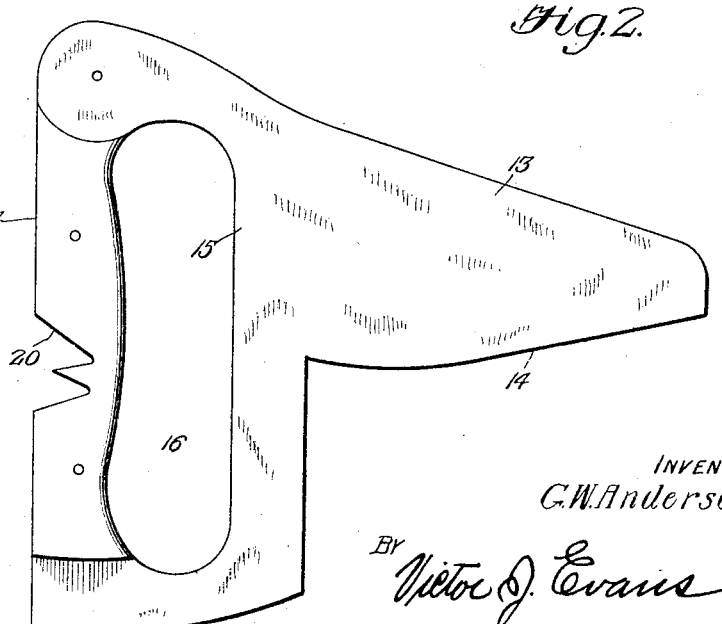
WITNESSES
J. H. Crawford
INVENTOR
G. W. Anderson,
By Victor J. Evans
ATTORNEY

UNITED STATES PATENT OFFICE.

GEORGE W. ANDERSON, OF EL CENTRO, CALIFORNIA.

CORN-KNIFE.

1,331,407.   Specification of Letters Patent.   Patented Feb. 17, 1920.

Application filed June 10, 1919. Serial No. 303,023.

*To all whom it may concern:*

Be it known that I, GEORGE W. ANDERSON, a citizen of the United States, residing at El Centro, in the county of Imperial and State of California, have invented new and useful Improvements in Corn-Knives, of which the following is a specification.

This invention relates to knives for cutting corn and the like, and has for its object the provision of a knife embodying a supporting frame adapted to be held within the hand of the operator and having pivoted therein a bar carrying a cutting blade coöperating with the frame bar whereby upon contraction of the hand of the operator the blade will be caused to exert a cutting action, the corn or other plant to be cut being initially engaged between a portion of the frame and the blade.

An important object is the provision of a device of this character in which the frame is so constructed that the back portion thereof may be comfortably engaged within the palm of the operator's hand and the bar associated with the cutting blade be conveniently grasped by the fingers, the specific arrangement being such as to afford the maximum degree of comfort to the operator during the cutting of plants whereby excessive fatigue will be avoided and whereby the operator may also exert powerful leverage without undue strain.

A further object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawing, in which—

Figure 1 is a perspective view of the device.

Fig. 2 is a longitudinal sectional view, and

Fig. 3 is a side elevation of the movable member.

Referring more particularly to the drawings, the numeral 5 designates the main frame of the device which has a shape similar to that of a saw handle and which includes a rear cross bar 6 formed for convenient engagement with the base of the palm of the hand. The sides 7 and 8 of the frame or handle 5 extend beyond the rear cross bar 6 to be engaged by the sides of the operator's hand whereby slipping will be prevented. The side 7 and the front cross bar 9 connecting both the sides are bifurcated, as shown. Formed at the juncture of the side 8 with the front cross bar 9 is a forwardly extending projection 10 which is longitudinally slotted, as shown at 11, and which serves as a stationary blade or abutment member. A shoulder 12 is formed within the projection 10, for a purpose to be described.

The movable portion of the device comprises a blade 13 which normally extends forwardly of the front cross bar 9 with its cutting edge 14 disposed in spaced relation to the projection 10 whereby to provide a space within which the stalks of the corn or other plant to be cut, are disposed. The blade 13 is preferably formed or secured upon a frame 15 which is provided with a cut out portion 16 for the passage of the operator's fingers and which is further provided at its rear edge with a bar 17 engageable by the fingers of the operator and which is suitably shaped for such purpose. This movable frame 15 is pivoted at 18 within a bifurcation of the side 7 and has its opposite end slidably movable within a bifurcation within the side 8. One corner of the frame 15 abuts against the shoulder 12 for limiting outward movement of the blade 13 under the influence of the spring 19 which is disposed between the bar 17 of the movable frame and the rear cross bar 6 of the stationary frame.

In the operation of the device, the operator places the rear cross bar 6 at the base of the palm of his hand and engages his fingers through the cut out portion 16 in the frame 15 and about the bar 17. The knife is then so disposed that a stalk to be cut is disposed between the projection 10 and cutting edge of the blade. The operator then simply contracts his hand and squeezes the bar 17 toward the bar 6 against the resistance of the spring 19, this act resulting in swinging movement of the frame 15 upon its pivot 18, which movement results in movement of the blade toward the projection 10. As the blade severs a stalk, which it does by a somewhat slicing action, as will be apparent, the cutting edge 14 will enter the slot 11 in the projection 10 so as to insure the stalk being cut entirely through. It will be seen that in view of the fact that the ends of the spring 19 are disposed within cut out portions 20 in the bars 6 and 17, when the operator squeezes the device the bar 17 will contact with the bar 6 in conforming relation to form a stop. As previously stated, movement of the blade in the other direction is limited by engagement of one corner of the frame 15 with the shoulder.

From the foregoing description and a study of the drawing, it will be apparent that I have thus provided a very simple and obviously inexpensive device by means of which corn or any desired plants, may be quickly and easily cut by squeezing action of the operator's hand instead of by a chopping action such as is necessary in the ordinary corn cutter.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A corn cutter comprising a stationary frame adapted for disposition against the palm of the hand, a projection on said frame forming in effect a relatively stationary blade, a frame pivoted within said stationary frame and having a portion thereof adapted for engagement by the fingers of an operator, a blade carried by said pivoted frame and adapted for coöperation with said relatively stationary blade, whereby upon contraction of the hand and resulting movement of said pivoted frame said movable blade will be caused to move toward said stationary blade.

2. A device of the character described comprising a relatively stationary frame including sides, front and rear cross bars and a projection formed at the juncture of one side with said front cross bar, the forward portions of said sides and the entire front cross bar being bifurcated longitudinally and said projection being longitudinally slotted, a shoulder formed within the bifurcation in said front cross bar, said rear cross bar being adapted for engagement within the palm of the hand, a frame disposed within the bifurcated portions of said stationary frame and pivotally connected with one side bar thereof, said pivoted frame being provided with a cut out portion permitting passage of the fingers and including a bar adapted to be engaged by the fingers, a blade extending from said pivoted frame in normally spaced relation to said projection, a spring interposed between said rear cross bar and said last named bar for holding said pivoted frame with a portion thereof engaging said shoulder, movement of said pivoted frame resulting in movement of said blade into the bifurcation in said projection.

In testimony whereof I affix my signature.

GEORGE W. ANDERSON.